United States Patent Office 3,281,480
Patented Oct. 25, 1966

3,281,480
STABILIZATION OF METHYL CHLOROFORM
Donald E. Hardies, Wadsworth, Ohio, assignor to Pittsburgh Plate Glass Company, Pittsburgh, Pa., a corporation of Pennsylvania
No Drawing. Filed Aug. 9, 1961, Ser. No. 130,258
7 Claims. (Cl. 260—652.5)

This application is a continuation-in-part of my earlier application Serial No. 95,004, filed March 13, 1961, now United States Letters Patent 3,128,315.

This invention deals with methylchloroform. More particularly, it is concerned with the protection of methylchloroform against decomposition by means of stabilization.

Methylchloroform, 1,1,1-trichloroethane, is a volatile liquid chlorinated hydrocarbon having low toxicity to warm blooded animals, is virtually nonflammable and is an excellent solvent for oil, greases and the like. Other uses of methylchloroform include its use as a vapor pressure depressant in aerosol sprays and to a lesser degree is a spotting solvent for dry cleaning. Unfortunately, methylchloroform is somewhat unstable and its use is rife with decomposition problems unless properly stabilized.

Numerous materials have been proposed as stabilizers for methylchloroform but virtually all of these suffer disadvantages. A common disadvantage is the difference in boiling point between methylchloroform and its stabilizer. This leads to a separation of the stabilizer from methylchloroform when attempts are made to recover or process used or spent solvent. The solvent properties of methylchloroform are such that it has considerable commercial interest. However, reprocessing in degreasing applications is needed to improve the economies of its use. Because of the variety of uses to which methylchloroform is likely to be put, it must therefore be stabilized with materials which do not interfere with its use in various applications, which are not easily separated therefrom and which protect light metals, notably aluminum, from chemical attack by methylchloroform as well as from attack from the stabilizers so used.

In the majority of uses for methylchloroform it is employed to clean small parts or special fabrications from metal. When inadequately stabilized methylchloroform stands in contact with aluminum, or if during such contact the exposed metal surface is scratched by a sharp object, interaction between the metal and solvent frequently occurs to the end that hydrogen chloride gas and other decomposition products are formed. Decomposition of the solvent and attack upon the metal result in a severe discoloration of the solvent and frequently a blackening or complete conversion to tarry substances with copious simultaneous evolution of hydrogen chloride. Hence, a constant search for successively better stabilizers for methylchloroform is necessary.

Now it has been discovered that the stability of methylchloroform may be enhanced in such a manner that benefits accrue in the form of longer life, greater freedom from attack on light metals, notably aluminum, and more ready compliance with the most severe tests.

In accordane with this invention methylchloroform is stabilized by dissolving therein a small stabilizing quantity of an aliphatic monohydric alcohol, notably tert-butyl alcohol, a small stabilizing quantity of a nitroalkane, notably nitromethane, a small stabilizing concentration of a dialkoxyalkane, notably 1,2-dimethoxyethane, and a small stabilizing concentration of an epoxide, notably 1,2-butylene oxide.

In accordance with the practice hereof, the components of the stabilizer formulation are added to the solvent while employing a simple stirring procedure until uniformly mixed. The individual components are measured by weight or by volume equivalent to a given weight and stirred into the methylchloroform one after the other in any appropriate order. Alternatively, a concentrate may be prepared of each of the separate components or of the several components and incorporated in the main body of the solvent by simple admixture.

Any amount of tert-butyl alcohol capable of producing stabilization in the presence of economic quantities of the other stabilizing components may be employed. For example, in the presence of approximately 1 percent by weight of 1,2-dimethoxyethane, 3 percent by weight nitromethane and 1 percent by weight of 1,2-butylene oxide, as little as 1 percent by weight of tert-butyl alcohol will produce stabilization. Larger quantities of certain of or all of the other three components will permit reduction of the amount of tert-butyl alcohol still further. Conversely, one may employ quantities of tert-butyl alcohol as great as 10 percent by weight or even greater while simultaneously employing smaller quantities of one or more of the other three components. If extremely large amounts of these other three components are employed, the quantity of tert-butyl alcohol necessary may be reduced to as little as 0.05 percent by weight. The preferred amount of tert-butyl alcohol, however, is generally 1 to 5 percent by weight. Other monohydric alcohols may be substituted for tert-butyl alcohol. Few of these, however, produce significantly beneficial results without simultaneously requiring uneconomic increases in the concentrations of the other stabilizing components in this system. Tert-amyl alcohol, however, may be employed in approximately the same concentration as tert-butyl alcohol. Aliphatic monohydric alcohols containing a second functional group are also often effective. Illustrative is 2-methyl-3-butyn-2-ol.

Generally, any nitroalkane containing from 1 to 3 carbon atoms will function as a stabilizer in admixture with a low molecular weight monohydric alcohol, a dialkoxyalkane and 1,2-butylene oxide to result in a useful methylchloroform formulation which exhibits pronounced stability. Usually, nitromethane and nitroethane are preferred and nitromethane finds acceptability in formulations for a greater variety of service. Any amount of nitroalkane up to 5 percent or more by weight will function as a stabilizer in the presence of tert-butyl alcohol, dimethoxyethane and 1,2-butylene oxide. The preferred amount is from 0.5 to 5.0 percent by weight. It is generally not practical, however, to reduce any one of these other components to a concentration of less than 0.05 percent by weight and hence best results accrue to methylchloroform formulations wherein the nitromethane concentration is approximately 2 percent by weight. The nitromethane concentration may be reduced below this optimum amount by increasing the concentration of one or more of the other components. It is generally undesirable ecnomically to decrease the nitromethane concentration much below 1.5 percent by weight since economic gains by reducing the nitromethane concentration are offset by greater expenditure on one or more of the other components. Greater reduction in the concentration of the other components secured by increases in the concentration of nitromethane are obtained at the expense of loss in the stability of the resulting formulations. Hence, it is desirable to maintain a concentration of nitromethane between about 1.5 percent and 2.5 percent by weight of the formulation.

A variety of dialkoxyalkanes may be employed in admixture with monohydric alcohol, nitroalkane and 1,2-butylene oxide. Formulations prepared from certain of such materials have partial vapor pressures of dialkoxyalkane such that partial separation of methylchloroform from the dialkoxyalkane occurs during volatilization. This results in deposits of dialkoxyalkane from formulations of the higher members upon materials subjected to degreasing action of the formulation. Hence, it is preferred in the greater variety of applications to employ only 1,2-dimethoxyethane as the dialkoxyalkane in the formulation. Any reasonable quantity of 1,2-dimethoxyethane may be employed as long as sufficient amount of the other stabilizing components, monohydric alcohol, nitroalkane and 1,2-butylene oxide, are employed. It is necessary to employ at least about 0.05 percent by weight of 1,2-dimethoxyethane in the presence of concentrations of 1,2-dimethoxyethane to reduce the concentrations of the other components accordingly. It is preferred that a concentration within the range of from 0.05 percent to 5.0 percent by weight of 1,2-dimethoxyethane is employed.

An epoxide containing up to about 8 carbon atoms may be employed to impart stabilizing actions to methylchloroform formulations comprising mixtures of the epoxide, monohydric alcohol, nitroalkane, dialkoxyalkane and methylchloroform. The preferred epoxides are those containing 3 or 4 carbon atoms such as 1,2-propylene oxide, glycidol, epichlorohydrin, 1,2-butylene oxide, 2,3-butylene oxide, 2-methyl-1,2-propylene oxide. The greater variety of applications of methylchloroform are satisfied by employment of 1,2-butylene oxide. Any amount of epoxide may be employed up to about 5 percent by weight. At such high levels of 1,2-butylene oxide concentration, however, it is desirable to reduce the concentration of the other stabilizing components accordingly. Likewise, the 1,2-butylene oxide concentration may be reduced to 0.05 percent by weight by correspondingly increasing the concentration of the other three components to as much as 5 percent by weight. A preferred concentration range is from 0.05 percent to 5.0 percent by weight.

A balance of concentrations of the four components employed is generally sought such that the total concentration of additives is between 2 and 8 weight percent. Best results have accrued to methylchloroform formulations when the total concentration of additives is approximately 6 percent by weight. Thus, it is desired to maintain a concentration of monohydric alcohol from 2.0 to 4.0 percent by weight, of nitroalkane from 1.0 to 3.0 percent by weight, of 1,2-dialkoxyalkane from 0.1 to 1.0 percent by weight, of an epoxide from 0.1 to 1.0 percent by weight.

When the specific components of the formulation are tert-butyl alcohol, nitromethane, 1,2-dimethoxyethane and 1,2-butylene oxide, preferred concentration ranges are 1.0 to 5.0 percent by weight tert-butyl alcohol, 0.5 to 5.0 percent by weight nitromethane, 0.1 to 1.0 percent by weight 1,2-dimethoxyethane and 0.1 to 1.0 percent by weight 1,2-butylene oxide. Likewise, when tert-amyl alcohol is alternatively employed as the monohydric alcohol, the corresponding preferred concentrations are 1.0 to 5.0 percent by weight.

The following examples illustrate this invention and demonstrate the unexpected benefits obtained from the multiple component stabilizer system.

EXAMPLE

Four portions of methylchloroform were placed in suitable containers. To one portion nothing was added. To a second portion 0.5 percent by weight of 1,2-dimethoxyethane was added and stirred to dissolve therein. To a third portion sufficient nitromethane, tert-butyl alcohol and 1,2-butylene oxide were added to result in a solution containing 2 percent, 3 percent and 0.5 percent by weight respectively. To the fourth portion were added sufficient nitromethane, tert-butyl alcohol, 1,2-butylene oxide and 1,2-dimethoxyethane to result in a solution containing respectively 2 percent, 3 percent, 0.5 percent and 0.5 percent by weight. These solutions were then placed in flat dishes submerging in each a strip of aluminum metal. Against this strip of aluminum metal lying flat on the bottom of the dish was brought to bear a Martindale rotary file 3003–S at a pressure of 4 kilograms and rotating at a speed of 250 revolutions per minute. Each of the solutions was exposed to the grinding action of the rotary file for a period of three minutes and then allowed to stand in contact with the aluminum for 24 hours. Only the four component mixture was found to be stable as shown in the following table.

*Table I*

| Methylchloroform containing by weight: | Result after 24 hours |
|---|---|
| Nothing added | Complete decomposition to tar in 20 minutes. |
| 1,2 - dimethoxyethane only, 0.5% | Complete decomposition to tar in 2.75 hours. |
| Nitromethane, 2%<br>Tert-butyl alcohol, 3%<br>1,2-butylene oxide, 0.5% | Light amber color precipitate present. |
| Nitromethane, 2%<br>Tert-butyl alcohol, 3%<br>1,2-butylene oxide, 0.5%<br>1,2-dimethoxyethane, 0.5% | No indicia of decomposition. |

Examination of the above data indicates that only the methylchloroform containing a four component stabilizing system withstood the rigorous test procedure.

While the invention has been described with particular emphasis on preferred compounds that are useful as components in the stabilization of methylchloroform where such compounds are aliphatic monohydric alcohols, 1,2-dialkoxyalkanes, epoxides and nitroalkanes, other compounds selected from these groups may also be employed.

Aliphatic monohydric alcohols other than tert-butyl alcohol which are satisfactory are those containing up to eight carbon atoms including notably methanol, ethanol, propanol, isopropanol, n-butanol, isobutanol, tert-amyl alcohol, isoamyl alcohol, n-hexanol and octanol. Instead of an aliphatic monohydric alcohol one having mixed functions may be employed. For example, a ketone alcohol like β-acetylethanol may be employed without departing from the spirit of the invention. Certain acetylenic alcohols, notably 2-methyl-3-butyn-2-ol can also be employed.

Subject to the preferences indicated above, other related dialkoxyalkanes up to those containing approximately eight carbon atoms will also contribute useful stabilization. Among these compounds are 1-methoxy-2-ethoxyethane; 1,2 - diethoxyethane; 1 - methoxy-2-n-propoxyethane; 1,2-di-n-propoxyethane.

Nitroalkanes other than nitromethane and nitroethane which are satisfactory incdlude the nitropropanes, 1-nitropropane and 2-nitropropane.

While the invention has been described with references to specific details of certain embodiments, it is not intended to limit the invention to such details except insofar as may appear in the following claims.

I claim:

1. Methylchloroform containing in small stabilizing concentration a dialkoxyalkane of 4 to 8 carbon atoms, alkanol of 1 to 8 carbon atoms, a nitroalkane of 1 to 3 carbon atoms and an epoxide selected from the class consisting of alkylene oxides of from 2 to 8 carbon atoms, epichlorohydrin and glycidol.

2. Methylchloroform containing in combination a small stabilizing concentration of a dialkoxyalkane containing 4 to 8 carbon atoms, an alkanol containing 1 to 8 carbon atoms, a nitroalkane containing 1 to 3 carbon atoms and an epoxide selected from the class consisting of alkylene oxides of 2 to 8 carbon atoms epichlorohydrin and glycidol, 3. Methylchloroform containing a small stabilizing concentration of a dialkoxyalkane of 4 to 8 carbon atoms, an alkanol of 1 to 3 carbon atoms, a nitroalkane of 1 to 8 carbon atoms and 1,2-butylene oxide.

4. Methylchloroform containing a small stabilizing concentration of a dialkoxyalkane of 4 to 8 carbon atoms, an alkanol of 1 to 8 carbon atoms, nitromethane and 1,2-butylene oxide.

5. Methylchloroform containing a small stabilizing concentration of a dialkoxyalkane of 4 to 8 carbon atoms, tert-butyl alcohol, nitromethane and 1,2-butylene oxide.

6. Methylchloroform containing in small stabilizing concentration 1,2-dimethoxyethane, tert-butyl alcohol, nitromethane and 1,2-butylene oxide.

7. A composition comprising methylchloroform containing from 0.1 to 1.0 percent by weight of 1,2-dimethoxyethane, from 1.0 to 5.0 percent by weight tert-butyl alcohol, from 0.5 to 5.0 weight percent nitromethane and from 0.1 to 1.0 percent by weight 1,2-butylene oxide based on the methylchloroform content.

References Cited by the Examiner

UNITED STATES PATENTS

| | | | |
|---|---|---|---|
| 2,567,621 | 9/1951 | Skeeters et al. | 260—652.5 |
| 2,887,516 | 5/1959 | Ferri et al. | 260—652.5 |
| 2,947,792 | 8/1960 | Skeeters | 260—652.5 |
| 3,000,977 | 9/1961 | Patron et al. | 260—652.5 |
| 3,000,978 | 9/1961 | Fredenburg | 260—652.5 |
| 3,049,571 | 8/1962 | Brown | 260—652.5 |
| 3,128,315 | 4/1964 | Hardies | 260—652.5 |

LEON ZITVER, *Primary Examiner.*

ALPHONSO D. SULLIVAN, *Examiner.*

J. W. WILLIAMS, M. JACOB, *Assistant Examiners.*